United States Patent [19]
Lowell et al.

[11] Patent Number: 5,228,347
[45] Date of Patent: Jul. 20, 1993

[54] METHOD AND APPARATUS FOR MEASURING FLOW BY USING PHASE ADVANCE

[75] Inventors: Francis C. Lowell, Falmouth; Richard H. Lyon, Belmont, both of Mass.

[73] Assignee: ORE International, Inc., Falmouth, Mass.

[21] Appl. No.: 781,016

[22] Filed: Oct. 18, 1991

[51] Int. Cl.$^5$ .............................................. G01F 1/66
[52] U.S. Cl. ............................ 73/861.28; 73/861.27
[58] Field of Search ................ 73/861.27, 861.28, 195

[56] References Cited

U.S. PATENT DOCUMENTS

| | | | | |
|---|---|---|---|---|
| Re. 30,900 | 4/1982 | Shih | ............... | 73/861.27 |
| 4,144,753 | 3/1979 | Larsen | ............... | 73/861.27 |
| 4,462,261 | 7/1984 | Keyes et al. | ............... | 73/861.27 |
| 4,616,510 | 10/1986 | Moore | ............... | 73/861.27 |

*Primary Examiner*—Donald O. Woodiel
*Assistant Examiner*—Elizabeth L. Dougherty
*Attorney, Agent, or Firm*—Cesari and McKenna

[57] ABSTRACT

A flow meter (10) employs phased arrays (14a, 14b, 16a, 16b, 18a, 18b, 20a, and 20b) of ultrasonic transducers mounted on the exterior of a pipe (12) to transmit and receive sound directed through paths that pass through the pipe interior. The flow meter (10) determines the rate of fluid flow through the pipe (12) by comparing the sound-propagation times for sound traveling the same paths in opposite directions. By driving the transducers as phased arrays, the flow meter (10) can employ sound-propagation paths that form angles to the normal to the interior pipe wall that exceed those dictated by Snell's law as applied to the relative propagation speeds in the pipe wall and the fluid.

18 Claims, 5 Drawing Sheets

METHOD AND APPARATUS FOR MEASURING FLOW BY USING PHASE ADVANCE

BACKGROUND OF THE INVENTION

The present invention is directed to sonic flow meters including ultrasonic flow meters.

A popular way of making a fluid-flow measurement (i.e., of determining the speed of a fluid or, more typically, its volume rate of flow) in a fluid conduit is to employ an ultrasonic flow meter. Such meters send sound in opposite directions through the same path and measure the transit times required for the sound propagation. If the path has a component in the direction of the fluid flow, the fluid flow causes a difference between the two transit times, and this difference is indicative of the fluid velocity. Integrating the axial component of the fluid velocity over the conduit cross section yields the flow rate.

In principle, one can perform this method by employing transducers that are coupled to the outside surface of the conduit wall, and in fact this approach—that is, of coupling the transducers to the conduit wall rather than using transducers actually in contact with the fluid itself—has significant advantages. Coupling the transducers to the exterior of the conduit avoids the need to de-water the conduit and drill through the conduit wall, as is necessary with a "wetted" transducer, i.e., one that is in direct contact with the fluid. In the case of, for example, conduits used for hydroelectric power plants, the economic loss that results from de-watering can be considerable.

Despite these advantages, it has often been necessary in the past to use wetted transducers instead. The reason for this is that, when an ultrasonic transducer element launches its output through a (usually) high-ultrasound-velocity conduit wall into the relatively low-ultrasound-velocity fluid within the conduit, Snell's law imposes a limit on the angle that the main lobe of the resulting diffraction pattern can form with the normal to the conduit wall. If a measurement path is to be used that significantly exceeds the Snell's-law limit, therefore, the received signal that results from that path tends to be dwarfed by signals received from other paths, and the measurement cannot be made accurately, if at all.

The resultant limitation to small angles would not be a problem if the fluid velocity were strictly axial and the shape of the velocity profile throughout the conduit cross section were known; so long as one knew the speed of sound in the fluid, the conduit cross-sectional area, and the angle that the sound path forms with the conduit axis, the flow-rate computation would be a straightforward matter, and the accuracy would be limited only by the time-measurement resolution.

But the fluid-flow direction is not always strictly axial, and the shape of its profile is rarely predictable. Since the flow direction is not strictly axial, part of the sonic transit-time difference can undesirably result from the non-axial fluid-velocity components, which do not contribute to the flow to be measured. The significance of this "cross-flow" error is greater when the non-axial component of the ultrasound path is large in comparison with the axial component, as it is at the path angles that are possible with prior-art externally mounted flow meters. Still, the cross-flow problem can be overcome by employing crossed sound-propagation paths.

The more-difficult problem results from the unpredictable nature of the velocity profile. To obtain high accuracy, one must measure the transit-time difference not for a single diametral path but rather for a plurality of chordal paths so as to "sample" the average velocities at various slices through the conduit cross section. This means that ultrasound would have to be introduced at an angle to the wall-surface normal even if no axial ultrasonic-path component were necessary. As was mentioned above, Snell's law places a limit on how large this angle can be in traditional externally mounted flow meters. For accurate measurements, therefore, it has been necessary in the past to resort to wetted-transducer flow meters.

SUMMARY OF THE INVENTION

The present invention overcomes the angle limitations of prior-art externally mounted flow meters by forming what we refer to as a "virtual phased array" on the interior conduit surface whose phase advance is such as to form a beam having a main lobe directed at an angle that exceeds the angle of total internal reflection. Either the transmitter, the receiver, or both employ phased arrays.

In the case of a transmitter, the virtual array is typically created by driving the conduit's exterior surface with sound whose combination of frequency and phase advance corresponds only to an evanescent ("forced") wave in the conduit material. Because the sound takes the form of an evanescent wave in the conduit material, it decays at least exponentially as it travels away from the transmitter through the conduit-wall material, and significant sound amplitude at the conduit wall's interior surface is present only opposite the transducer array. In that region, however, the vibrating wall forms a "virtual phased array," whose phase advance is determined by that at the exterior surface and concentrates the majority of the sound power (or at least of that part of the sound power that reaches the complementary transducer at the time of measurement) in a beam centered on the measurement path. Thus, the transmitting transducer array causes relatively little sound that can be reflected or refracted to the receiving transducer from directions other than that of the intended measurement path.

In the case of a receiver, the operation is just the reciprocal. This makes the receive signal sensitive to sound from the path and relatively insensitive to sound from other directions.

Accuracies significantly higher than those of prior-art externally mounted flow meters can thereby be achieved.

DETAILED DESCRIPTION OF ILLUSTRATIVE EMBODIMENTS

Figure 1:
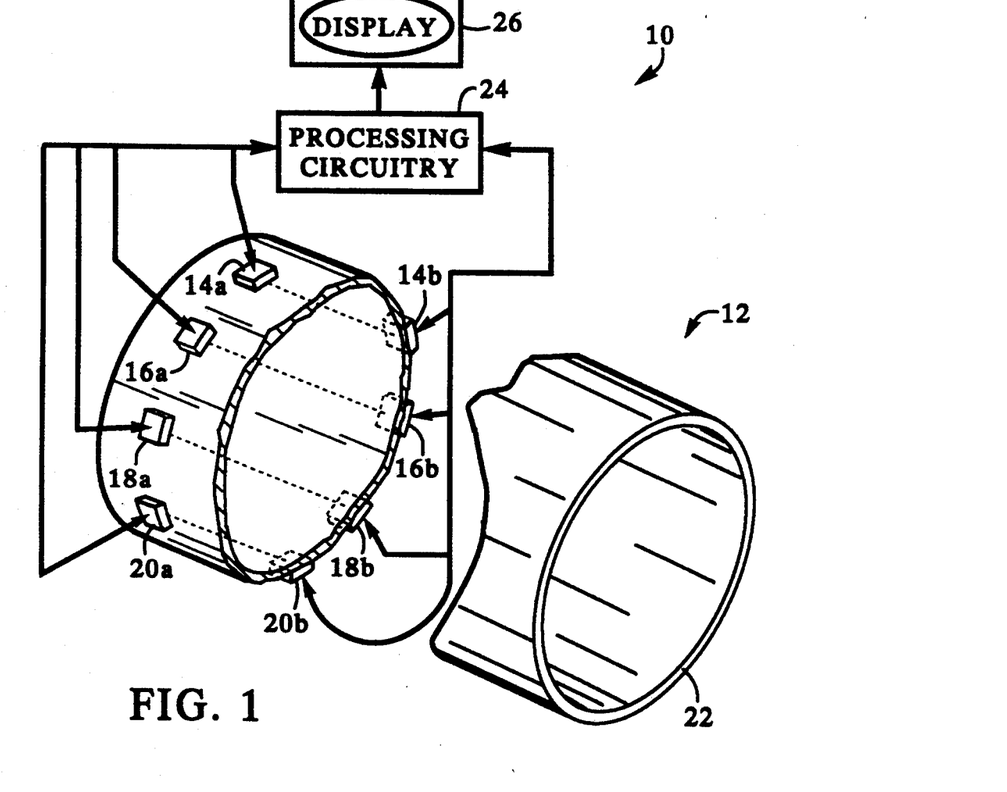
FIG. 1 is a simplified isometric view of a flow conduit showing the placement of transducers for an ultrasonic flow meter.

FIG. 1 depicts a flow meter 10 for measuring the flow of a fluid through a pipe or other conduit 12. For this purpose, four pairs of transducers 14a and 14b, 16a and 16b, 18a and 18b, and 20a and 20b are arrayed around the exterior of the conduit wall 22.

To determine the rate of flow, processing circuitry 24 drives transducer 14a and measures the delay between the time at which transducer 14a is driven at the time at which transducer 14b receives the resulting sonic signal. In principle, the frequency of the sound can be within, above, or below the audible range, but practical flow meters almost invariably employ ultrasonic frequencies.

The processing circuitry 24 then reverses the process, driving transducer 14b and receiving the resulting signal at transducer 14a. If the displacement vector between transducers 14a and 14b has a component in the direction of fluid flow between the transducers, the travel-time measurement taken in one direction will differ from that taken in the other direction, and the difference will be an indication of the component of the flow velocity along the path between the transducers.

A single pair of transducers can thus give a flow measurement, and it will become apparent that the teachings of the present invention can be embodied in such a single-path meter. Since flow velocity is not in general uniform, however, the processing circuitry 24 of the illustrated embodiment also performs similar operations by using further transducer pairs 16a and 16b, 18a and 18b, and 20a and 20b. By applying well-known numerical-integration curve-fitting techniques to these velocity "samples," the processing circuitry 24 determines the rate of flow through the pipe 12, and it transmits signals indicative of the computed flow rate to a display 26 or to some process-control circuitry.

Figure 2:
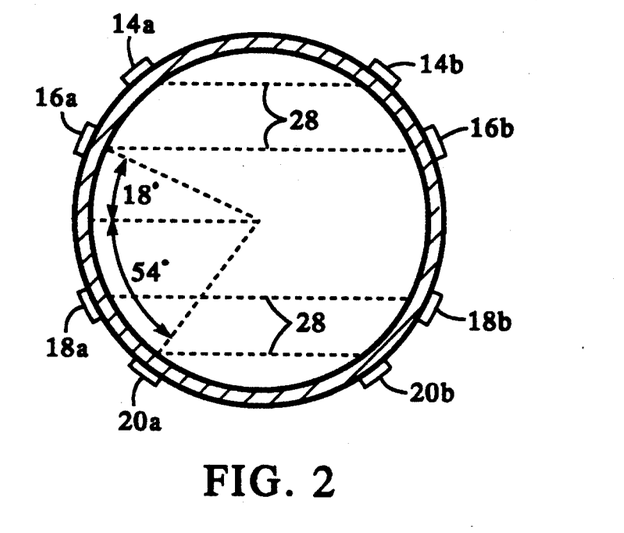
FIG. 2 is an end view of the conduit also showing the transducer-placement geometry.

To obtain the best accuracy from the known approximation techniques, it is important that the paths 28 between the transducers be judiciously selected. For "Chebyshev" spacing of a four-transducer-pair flow meter, the projections of the paths between transducers 14a and 14b and between transducers 20a and 20b onto a plane perpendicular to the pipe axis form angles of 54° with the normal to the pipe wall, while the corresponding angles for the other two paths is 18°. "Chordal" measurement thus necessitates orienting the paths 28 at significant angles to the pipe-wall normal.

Figure 3:
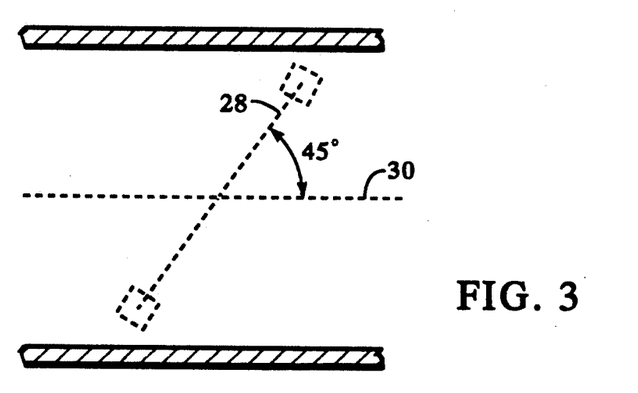
FIG. 3 is a plan view of the conduit, also depicting the transducer-placement geometry.
Figure 4:
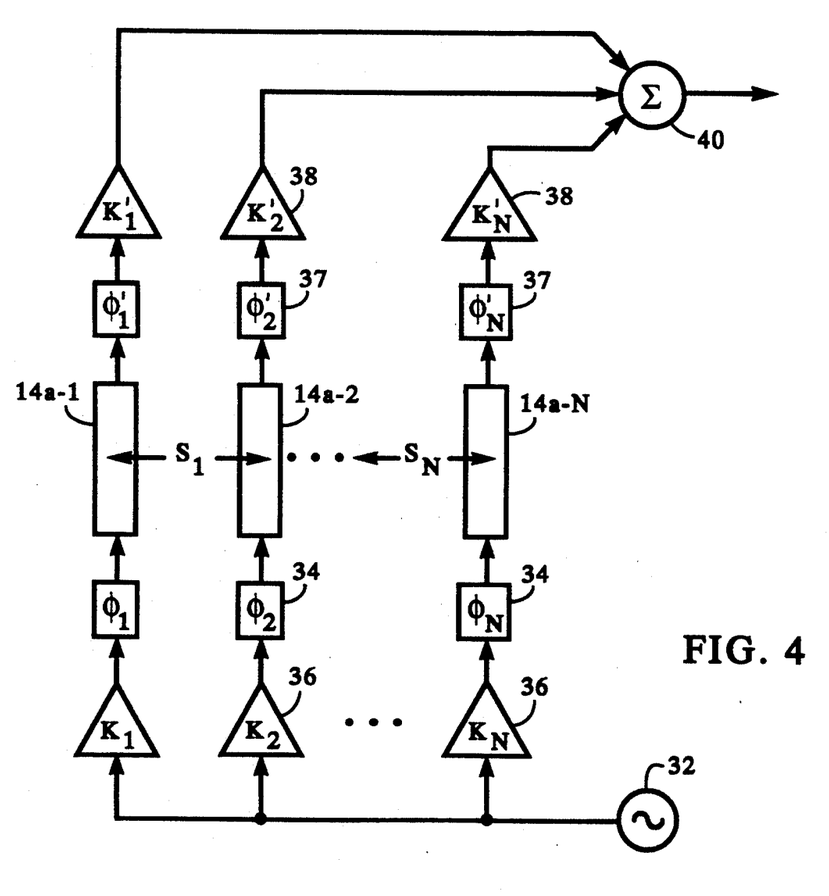
FIG. 4 is a diagram conceptually depicting phased-array operation.

Moreover, the angles are even greater than is apparent from FIG. 2 because of the need to obtain a significant axial path component. In the illustrated embodiment, this is achieved by angling the paths 28, as FIG. 3 indicates, so that they lie in a plane that forms a angle of 45° with the pipe axis 30. Accordingly, the angles that the paths form with the normals are actually 66° and 48°. To direct the sonic beam into such paths, the transducers are phased arrays. For instance, transducer 14a may consist, as FIG. 4 illustrates, of a plurality of transducer elements 14a-1, 14a-2, ..., 14a-N, separated by spacings $s_1, s_2, \ldots, s_{N-1}$. Each is driven by a respective signal generated by subjecting the output of a common source 32 to respective phase shifts represented by phase-shift blocks 34, possibly with some relative weighting introduced by respective amplifiers (or attenuators) 36. For reception, similar phase-shifting—and possibly similar weighting—represented by blocks 37 and 38 of FIG. 4 are applied to the received signals, and an analog adder 40 combines the results so that signals from the desired path add constructively while those from other directions interfere destructively. This increases power and sensitivity in the desired path while reducing them in other paths.

As is conventional in phased arrays, transducers spaced apart by a separation $s_k$ along an array axis steer the resultant beam to an angle $\theta$ with the normal to that axis by operating out of phase with each other by a phase advance $\phi_k = s_k k \sin\theta$, where k is the wave number (in radians/unit length) of the resultant propagating wave. In a conventional externally mounted flow meter, this is accomplished by first launching a traveling wave in the conduit wall whose direction $\theta_w$ is related to the desired direction $\theta_f$ in the fluid by Snell's law; i.e., $\theta_w = \sin^{-1}[(k_f/k_w)\sin\theta_f]$, where $k_f$ and $k_w$ are the wave numbers in the fluid and conduit wall, respectively.

The maximum such angle $\theta_f$ in the fluid obtainable with this approach is the critical angle $\theta_c$, which results from the maximum angle (90°) in the conduit wall, i.e., $\theta_c = \sin^{-1}(k_f/k_w)$.

Now assume that the pipe 12 is made of steel, the fluid inside is water, and the water temperature is such that the speed of sound in the water is 1450 m/sec. Even if the meter employs the (relatively slow) shear mode of propagation through the pipe wall, the propagation speed in the pipe wall is still on the order of 3140 m/sec, so the maximum Snell's-law angle is 28° with the normal to the wall surface. In a conventional flow meter, therefore, it would not be practical for the paths between the transducers to exceed this angle by more than about 1°, as they do in FIGS. 2 and 3. In accordance with one embodiment of the present invention, however, sound communication can be performed effectively by way of the indicated paths 28 because one or both transducers of each transducer pair is an array of transducer elements driven or sensed in a phased-array fashion so as to steer the resultant beam to an angle considerably greater than the Snell's-law angle.

That is, the phase advance $\phi_k$ exceeds $s_k k_w$ in our method. The fundamental spatial frequency imposed upon the exterior conduit-wall surface thus exceeds the spatial frequency $2\pi/k_w$ of a traveling wave in the wall, and theory tells us that such a boundary condition in a semi-infinite medium yields only an evanescent wave, i.e., one in which the pressure and motion variations have such phase relationships that the wave carries no average net power and decays exponentially with distance from the source. But we have recognized that a "virtual phased array" having such a high phase advance can nonetheless be used for externally-mounted flow-meter operation, because operation of the phased array at the outer wall surface causes a phase advance at the inner wall surface the same as that at the outer wall surface (if parallel wall surfaces are assumed) even when that phase advance corresponds to only an evanescent wave in the conduit wall. The result is a traveling wave in the fluid whose angle with the normal to the conduit wall exceeds the Snell's-law limit and thus yields a sound path in the fluid whose axial component is, as desired, relatively large. The reason why power is transmitted through the pipe wall despite the evanescent-wave propagation in it is that the inner pipe-wall surface imposes a second boundary condition, which requires superimposition of a reverse evanescent wave on the originally launched wave in such a manner that the resultant phase relationships in the conduit wall yield a net power flow.

Of course, such an approach can be avoided if the disparity between refractive indices is not so great. For example, one might conceive of a reasonably accurate two-path, 65° plane-angle Chebyshev chordal-measurement scheme for a refractive-index ratio of, say 1.5. For ratios greater than this, or at least greater than 1.62, however, we believe that the present invention yields significant advantages.

Figure 5A:
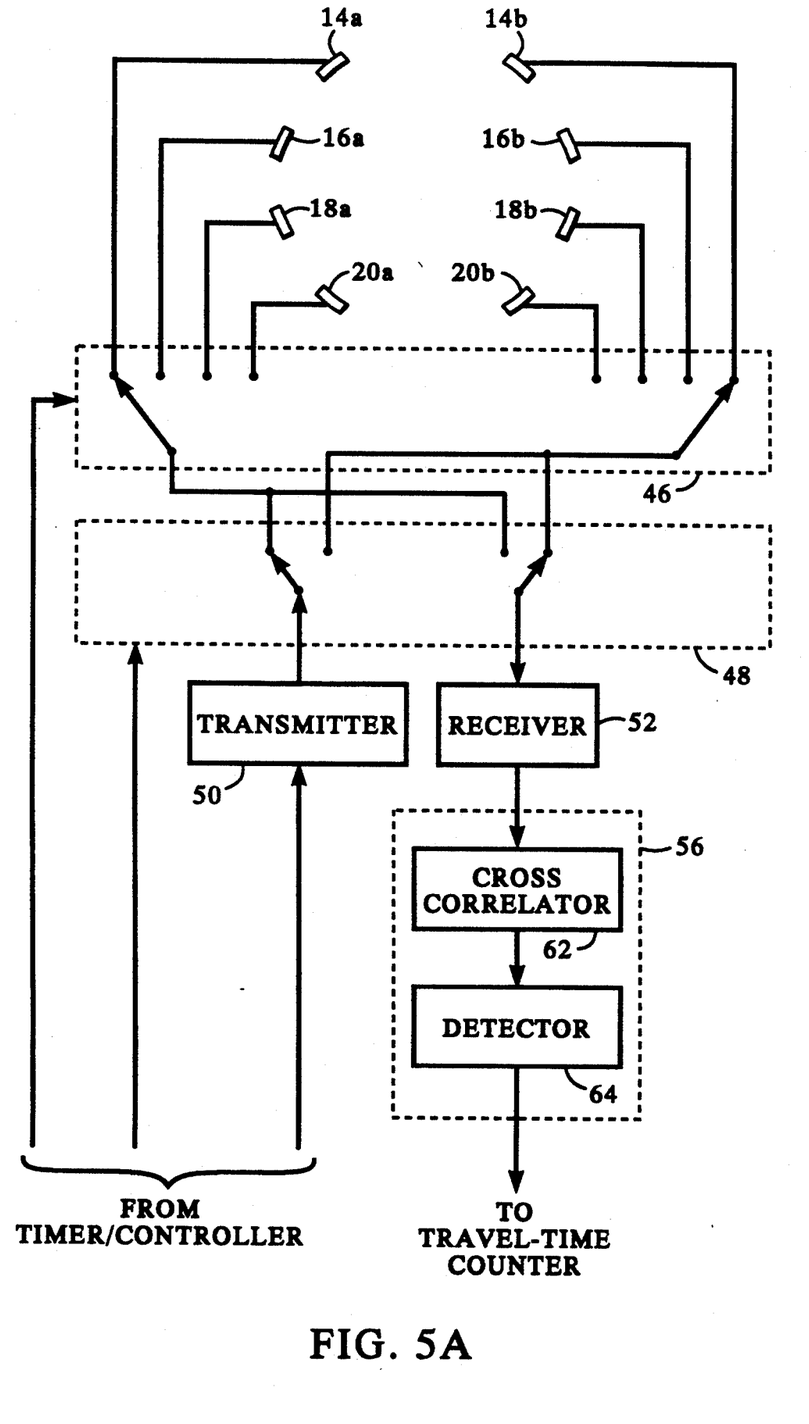
FIGS. 5A and 5B together form a block diagram of a typical flow meter of the type that might employ the teachings of the present invention.
Figure 5B:
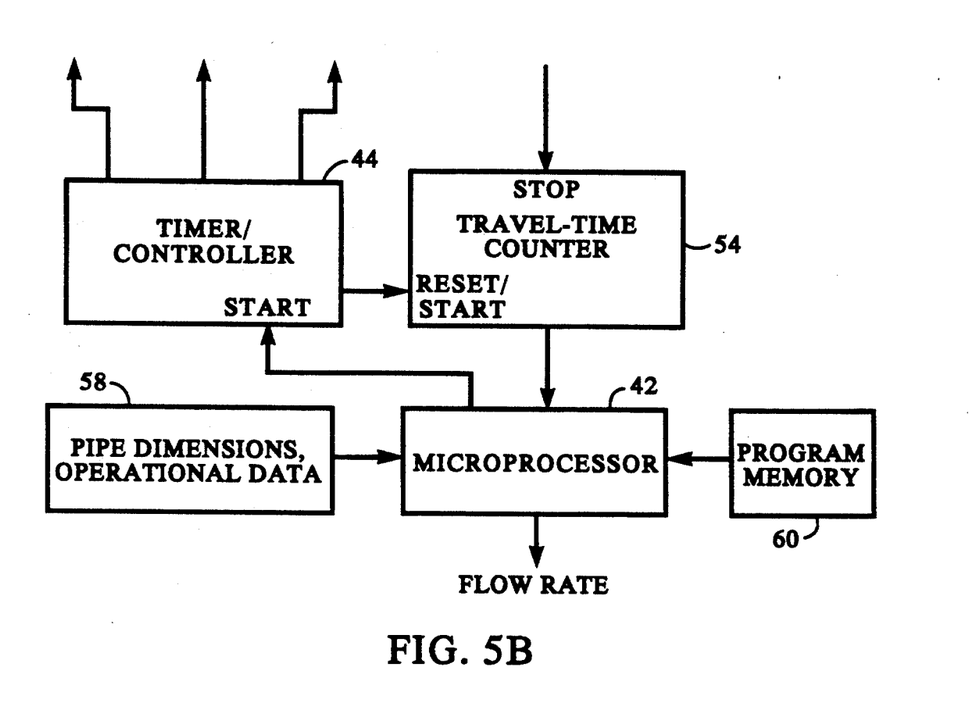

FIGS. 5A and 5B depict apparatus of the type that might be employed to carry out the teachings of the present invention in a flow meter. When a measurement is to be made, a microprocessor 42 commands a timer/controller 44 to begin operation. That controller 44 operates a path selector 46 and direction controller 48 to connect the appropriate transducers to a transmitter 50 and a receiver 52. The controller then triggers the transmitter 50, which generates the several phase-offset signals and applies them through the direction controller 48 and path selector 46 to the elements of the particular transducer to be driven. When the timer/controller 44 triggers the transmitter 50, it also causes a travel-time counter 54 to reset and begin counting. The timer/controller 44 then turns off the transmitter 50 while the travel-time counter continues measuring the time that has elapsed since the transmitter 50 caused the one of the selected transducers to transmit the ultrasonic signal.

The receiver 52 eventually receives the resultant ensemble of signals from the other selected transducer. The receiver 52 adds the ensemble together in the appropriate phase relationship and applies the resultant sum signal to processing circuitry 56, whose output is a pulse that stops the counter 54 when the sum signal meets certain (amplitude-related) criteria. The counter 54 applies the resultant travel-time measurement to the microprocessor.

The operation is then repeated with the direction controller 48 switched to its other state to produce a second travel-time measurement. By comparing the two travel-time measurements and taking into account the path dimensions and other operational data stored in a memory 58 provided for that purpose, the microprocessor 42 operates under control of a program in a memory 60 to compute a fluid velocity for the path just measured.

By repeating this operation with the path selector 46 in different states, the microprocessor 42 computes the flow rate by multiplying the pipe's cross-sectional area by a sum of the computed velocities weighted to achieve, say, a Chebyshev approximation, as will be familiar to those skilled in the art.

As was mentioned above, the different paths form different angles with the normals to the wall surface at the points at which they intersect it. For many arrays, these differences will be substantial; i.e., if the angle for one of the paths is centered in an array's main lobe, the angle for the other will be displaced from the center by enough that a measurement for that path cannot be made effectively with an identical (and identically driven) array.

In some embodiments of the invention, therefore, the frequency (or, as will be described below, frequency range) of the transmitter will be changed when the path selector 46 changes so as to permit identical arrays to be used for paths that form different angles with the pipe-wall normal. The same effect can be achieved by using different phase advances per transducer element. Identical arrays can be used even without changing frequencies or phase advances if the angles formed with the pipe axis by the paths' plan-view projections so differ as to yield equal angles with the pipe-wall normals at the paths' points of intersection.

In certain applications, accommodations may need to be made for the fact that sound waves in the pipe wall are evanescent, "forced" waves rather than propagating, "free" waves. Specifically, evanescent waves decay exponentially with distance, as was mentioned above. While this yields the desirable effects mentioned above, it also affects the interior-wall amplitude immediately opposite the array. This is particularly true, of course, for relatively thick pipe walls. For such walls, it will ordinarily be necessary to use an ultrasonic frequency significantly below those normally used for flow measurement; decreasing the frequency tends to reduce the rate of attenuation.

Everything else being equal, however, frequency reduction also reduces the resolution with which the travel time can be measured. To overcome this problem, one can appropriately encode the transmitted signal and use a filter on the receiving end that is matched to the selected encoding. Such techniques are typically used in radar, sonar, medical ultrasound, and related arts for pulse compression and thus time-resolution enhancement.

One of the most common types of encoding, of course, produces a "chirp" signal, i.e., a signal whose instantaneous frequency increases or decreases with time. For instance, the transmitter 50 could be a chirp transmitter that transmits a two-millisecond pulse having a frequency that sweeps from 80 kHz to 120 kHz. Ordinarily, the signal that the receiver 52 generates in response will have a duration somewhat in excess of that of the transmitted signal because the ensemble that the receiver 52 receives is generated by elements that receive their signals at slightly different times.

To a minor extent, this undesirable spreading of the signal can be reduced by imposing actual time delays to introduce the transmitting transducer elements' phase shifts and thus staggering the times at which they begin transmitting. In most cases in which duration reduction is needed, however, more reduction than this is required. Obtaining this reduction in output-signal duration—and the resultant increase in time-measurement resolution—is the purpose of the matched filter provided by the signal-processing circuitry 56.

As an example, FIG. 5A depicts the signal-processing circuitry 56 as having the form of a cross-correlation circuit 62 and a detector 64. The cross-correlation circuit 62 receives a replica of the transmitted signal and cross-correlates this with the received signal. The resultant output is minor except at a correlation delay equal to the travel time, when the two signals "match" and produce a large output signal. The resultant correlator output pulse is accordingly significantly compressed in time in comparison with the output of the receiver 52 if the correlation records are long enough. The detector 64 produces the counter-stopping output pulse when the correlator output exceeds a predetermined minimum. In this way, the travel-time resolution can be greatly increased.

Other types of encoding and matching, well known to those skilled in the art, can also be used; actual digital correlation is not necessary. For instance, one type of chirp-signal generation involves applying a very-shortduration DC pulse to a dispersive delay line, possibly before or after band-pass filtering. Since different frequency components traverse the delay line at different speeds, the resultant signal is a chirp signal. Matching at the receive side can then be accomplished simply by applying the received signal to a delay line whose dispersion curve is the reverse of that of the transmitter's delay line. This and other well-known approaches can be employed with the present invention.

As those skilled in the art are also aware, although elements in most phased arrays are spaced equally both in physical position and in phase, this is not always so, and it may be desirable in chirp-signal or other encoded versions of the present invention to employ non-uniform spacing. For a given spacing, for instance, the main-lobe direction depends on frequency if no adjustments in phase offset are made to counteract the direction change. Since such adjustments will in many situations be considered too complex, it may be preferable to provide the transducer elements in, for instance, a logarithmic spacing so that, as the instantaneous frequency of the chirp signal changes and the main lobe of the beam from one part of the array moves away from the direction of the path between the transmitting and receiving transducers, the beam from another part of the array becomes directed into that path.

Figure 6:
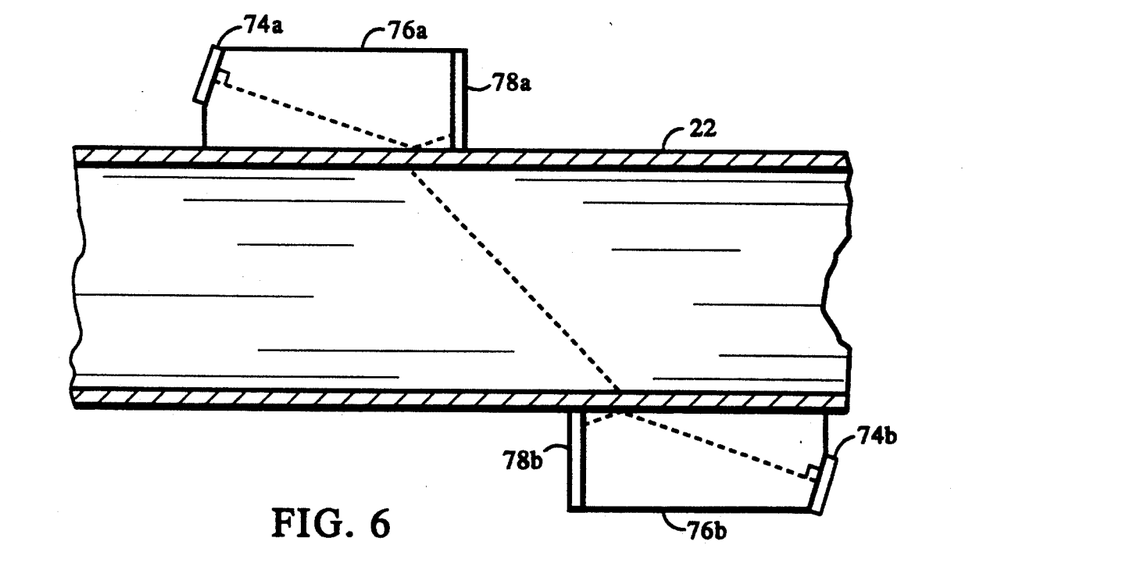
FIG. 6 is a cross-sectional view of an alternate embodiment of the present invention.

In other situations, on the other hand, the adjustment of phase advance for frequency is not at all complex. For example, consider the arrangement depicted in FIG. 6. FIG. 6 depicts one pair of transducers 74a and 74b.

Each transducer 74a or 74b can in principle be a single element, although in practice it may be found convenient to employ a plurality of elements driven or sensed in phase. Each transducer is mounted on a respective low-refractive-index block 76a or 76b, which is mounted to the exterior surface of the pipe wall 22. Each transducer is mounted at such an angle that it launches waves whose angle with the normal to the pipe wall 22 exceeds the angle of total internal reflection in the block. In other words, the launched waves result in a phase advance at the block-wall interface that causes the desired evanescent waves in the pipe wall 22. Acoustically non-reflective absorbers 78 prevent the reflected sound from interfering with the intended signal at the exterior wall surface.

The angle at which the transducers are mounted is such that the resultant phase advance at the interior wall forms a beam directed at the complementary transducer; if the block 76 had the same index of refraction as the water inside the pipe, for example, the transducers would be angled so that the sound angle within the block is the same as the intended sound angle in the water. In the FIG. 6 arrangement, the phase advance at the block-wall interface changes automatically with the frequency at which the transducer is driven, and the change in phase advance maintains the desired angle independently of frequency.

To test the principle of transmission on which the present invention is based, we performed experiments on a vertically oriented three-eighths-inch-thick water-filled steel pipe that was six feet long and four feet in diameter. We performed two sets of experiments. The first involved only a single array. We drove the array and measured the resulting signal amplitudes at various physical angles by raising and lowering along the pipe axis a hydrophone immersed in the water.

In this experiment, an eight-element array of transducer elements was axially spaced along the exterior surface of the pipe wall. Each array element comprised a 15-cm × 1.9-cm strip of 52-micron-thick polyvinyl difluoride (PVDF) folded along its length. The eight resultant folded pieces were attached with epoxy adhesive to the pipe exterior on half-inch centers. A single layer of 120-micron-thick lead backing was attached by epoxy to each element. Of course, other types of transducers can be employed, too, but the PVDF approach has certain advantages: a transducer array can readily be imprinted onto a single PVDF sheet and applied in that form to the exterior of the conduit.

Figure 7:
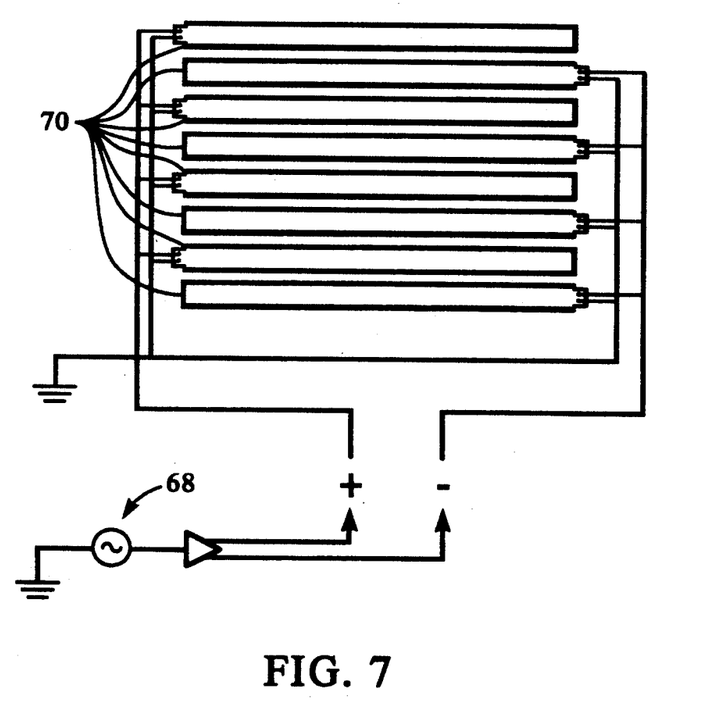
FIG. 7 is a diagram of a transducer array and simple phasing arrangement that we have employed to demonstrate the principles of the present invention.

To produce the phased-array relationship, the transducer elements were driven in the manner depicted in FIG. 7. Specifically, a signal generator 68 was operated in a "bridge" mode to generate opposite-polarity signals, which were applied to alternate elements 70. That is, the phase advance per element employed in the array was 180°. Of course, this resulted in two main lobes, but this is acceptable for most flow-meter applications, since the other transducer is located in only one of the lobes, and the other lobe is so directed that ordinarily very little of its sound could be reflected in such a manner as to interfere with the measurement. Accordingly, the phase-delay circuitry can be as simple as that depicted in FIG. 6. For increased efficiency, of course, more-complicated phasing and array design may be preferable so as to focus the sonic power into a single main lobe.

With the illustrated arrangement, we drove the array at frequencies of 75 kHz, 100 kHz, and 125 kHz. The resultant main-lobe angles were 31°, 42°, and 50°, respectively. Such angles result in flow-direction components that are appropriate for chordal-flow-meter operation. Half-power beamwidths for these frequencies ranged between about 6.5° and about 17°, the greatest beamwidth occurring at around 100 kHz.

We also performed a two-sided experiment, in which we used similar transducer arrays positioned at opposite ends of a path through the pipe axis and forming an angle of 45° with it. That is, the transmitter was driven as illustrated in FIG. 6, while sums of the odd and even transducer-element outputs at the receiver end were respectively applied as the inverted and non-inverted inputs to a differential amplifier. With this arrangement, a 7.1-volt-rms input yielded a 0.7-millivolt-rms output at the peak frequency of 95 kHz. The half-power bandwidth was 17 kHz.

It is thus apparent that the teachings of the present invention provide a way of achieving the high accuracy that chordal methods provide without suffering the difficulties in mounting that usually attend such methods. The present invention thus constitutes a significant advance in the art.

We claim:

1. In the method of measuring fluid flow by transmitting sound from outside a fluid conduit in opposite directions through a sound path that extends through the conduit wall and through a fluid within the fluid conduit, detecting from outside the fluid conduit the sound transmitted through the path, measuring the time between transmissions and receptions so as to determine travel times in the opposite directions, determining the flow of the fluid from the difference between the travel times, and generating a signal indicative thereof, the improvement wherein at least one of the steps of transmitting and receiving comprises transmitting or receiving with a phase advance at the exterior conduit-wall surface that corresponds to an evanescent wave in the wall of the fluid conduit at the frequency of the transmitted sound.

2. A method as defined in claim 1 wherein the angle formed by the path in the fluid with the normal to the interior surface of the conduit exceeds the inverse sine of the ratio of the speed of sound in the fluid to the speed of sound in the wall of the conduit by at least 1°.

3. A method as defined in claim 2 wherein the angle formed by the path in the fluid with the normal to the interior surface of the conduit exceeds 29°.

4. A method as defined in claim 1 wherein the ratio of the speed of sound in the conduit wall to that in the fluid exceeds 1.5.

5. A method as defined in claim 1 wherein at least one of the steps of transmitting and receiving comprises one of transmitting and receiving by means of a phased array of sonic transducers.

6. A method as defined in claim 5 wherein the transmitting and the receiving steps are both performed by means of phased arrays of sonic transducers.

7. A method as defined in claim 5 wherein the angle formed by the path in the fluid with the normal to the interior surface of the conduit exceeds the inverse sine of the ratio of the speed of sound in the fluid to the speed of sound in the wall of the conduit by at least 1°.

8. A method as defined in claim 7 wherein the angle formed by the path in the fluid with the normal to the interior surface of the conduit exceeds 29°.

9. A method as defined in claim 7 wherein both the transmitting and the receiving steps are performed by means of phased arrays of sonic transducers.

10. A method as defined in claim 5 wherein the ratio of the speed of sound in the conduit to that in the fluid exceeds 1.5.

11. A method as defined in claim 5 wherein:
A) the method comprises making the travel-time determination for each of a plurality of different paths; and
B) the step of determining the flow comprises determining the volume rate of flow from the differences between the travel times in the plurality of paths.

12. A method as defined in claim 11 wherein:
A) the angle formed by the projections of a first of the paths and the axis of the conduit onto a plane parallel to both is substantially different from the angle formed by the projections of a second of the paths and the axis of the conduit onto a plane parallel to both; and
B) the angles formed by the first and second paths with the normals to the interior surface of the conduit at the paths' respective intersections therewith are substantially equal,
whereby the frequencies and transducer arrays employed for the two paths can be identical.

13. A method as defined in claim 11 wherein:
A) the angles formed by first and second paths with the normals to the interior surface of the conduit at the paths' respective intersections therewith are substantially different; and
B) the ratio of frequencies of sound propagation in the two paths is substantially the reciprocal of the ratio of the tangents of the two paths' angles with their respective normals,
whereby the transducer arrays and phase advance used for the first and second paths can be identical.

14. A method as defined in claim 11 wherein:
A) the angles formed by first and second paths with the normals to the interior surface of the conduit at the paths' respective intersections therewith are substantially different; and
B) the ratio of the phase advances applied to the transducer arrays used for the first and second paths is substantially equal to the ratio of the tangents of the two paths' angles with the normals to the interior surface of the conduit at those paths' respective intersections therewith,
whereby the transducer arrays and frequencies used for the first and second paths can be identical.

15. A method as defined in claim 1 wherein:
A) the method comprises making the travel-time determination for each of a plurality of different paths; and
B) the step of determining the flow comprises determining the volume rate of flow from the differences between the travel times in the plurality of paths.

16. In a flow meter comprising sound transmission and reception means, adapted to be placed at opposite ends of a sound path that extends through a fluid, for transmitting sound in opposite directions through the sound path and detecting its arrival at the ends thereof and further comprising means for measuring the travel times required for the sound to traverse the sound path, for computing the difference there between, and for generating therefrom an indication of the flow of the fluid, the improvement wherein at least one of the sound transmission and reception means comprises means for performing transmitting or detecting with a phase advance at the exterior conduit-wall surface that corresponds to an evanescent wave in the wall of the fluid conduit at the frequency of the transmitted sound.

17. A flow meter as defined in claim 16 wherein at least one of the sound transmission and reception means comprises:
A) an array of transducer elements; and
B) circuitry for performing, for each direction of sound transmission, at least one of the sound transmission and detection by respectively driving the array elements as a phased array or combining the array elements' electrical outputs in a phased-array relationship.

18. A flow meter as defined by claim 17 wherein the circuitry performs the sound transmission by driving the array elements as a phased array and performs the sound detection by combining the array elements' electrical outputs in a phased-array relationship for both directions of sound transmission.

* * * * *